United States Patent Office 3,243,458
Patented Mar. 29, 1966

3,243,458
SEPARATION OF ACIDS OF NAPHTHALENE
John J. Melchiore, Wallingford, Del., and Ivor W. Mills, Glenolden, Pa., assignors to Sun Oil Company, Philadelphia, Pa., a corporation of New Jersey
No Drawing. Filed Feb. 12, 1965, Ser. No. 432,374
3 Claims. (Cl. 260—525)

This application is a continuation-in-part of application Serial No. 860,345, filed December 18, 1959, now abandoned.

This invention relates to a method for the separation of naphthalene carboxylic acids.

In a copending application, Serial No. 851,229, filed November 6, 1959, now abandoned, by the present applicants, there is described a process for the preparation of naphthalene dicarboxylic acids. Briefly, the process comprises contacting a dialkylnaphthalene isomer with oxygen and a cobalt salt at oxidation conditions to produce the corresponding naphthalene dicarboxylic acid isomer. The diacid product is contaminated with from about 30 to about 60 weight percent monoacid.

It is the object of this invention to provide a process for the separation of the diacid from the monoacid. A specific object of the invention is the separation of 2,6-naphthalene dicarboxylic acid from the monocarboxylic acid.

In the past, it has been the practice to separate aromatic oxidation products by crystallization; solvent extraction and distillation. The acids treated in the process of the present invention are not suited to the separation processes of the prior art because they tend to decompose on heating and also because of their crystal structure and mutual solubility in a few solvents, and mutual insolubility in most solvents.

Broadly speaking, the procedure of our invention comprises converting a mixture of the mono and diacids to the corresponding alkali metal salts. These salts are then dissolved in a solvent. Upon addition of a sufficient quantity of an anti-solvent or displacer to the solution, a precipitate is formed, which upon acidification contains about 90 percent diacid.

Salts of the crude mono and diacid mixture are formed by contacting with an appropriate base. The base is selected so that the salt formed will be soluble in common polar solvents. Compounds of alkali metals are suitable for the purpose. Alkali metal hydroxides, particularly sodium hydroxide, potassium hydroxide and lithium hydroxide may be titrated into the acid as a preferred technique. Ammonia and ammonium hydroxide as well as hydroxides of the alkaline earth metals are suitable bases. Sufficient base is added to achieve neutralization of all of the crude acid, the exact amount being determined by the amount of acid treated.

Both the salt-forming step and the separation step of the process can be carried out at atmospheric pressure. Subatmospheric pressures or superatmospheric pressures may be used. However, such pressures require the use of special processing equipment. Temperatures of 50° F. to 150° F. are used. Higher or lower temperatures may be used if desired. Certain solvents are more selective at particular temperatures which may be readily determined by those skilled in the art.

The solvents utilizable in the separation step of the present process comprise a polar solvent and a non-polar solvent which acts as an anti-solvent or displacer. The polar solvent may be an alcohol containing 1 to 7 carbon atoms such as methanol, ethanol, normal propyl alcohol and isopropyl alcohol, cyclohexanol and benzyl alcohol; a ketone, such as acetone; an ester such as a formate, acetate, propionate, carbonate or lactate; a glycol, such as ethylene glycol and glycol ethers. The non-polar solvent may be a hydrocarbon fraction containing an average of 5 to 15 carbon atoms per molecule such as petroleum naphtha, kerosine or a crude n-heptane fraction. Aromatic hydrocarbons such as benzene, toluene and xylene and hydroaromatic hydrocarbons such as tetralin, decalin and cyclohexane are also suitable. Non-polar chlorohydrocarbons including carbon tetrachloride, ethylene dichloride may be used.

The quantity of each type of solvent is relative. Sufficient polar solvent to dissolve all the acid salt is added and this will be determined by the amount of acid salt treated. Large excesses are to be avoided since an excess requires the use of large amounts of non-polar solvent or anti-solvent to throw the diacid out of solution.

Variations of the process will occur to those skilled in the art. For example, the mixed acid soaps may be formed by contacting the mixture of mono and diacids of naphthalene with a small amount of a diluent followed by the addition of the alkali metal salt. The diluent may be evaporated to recover the soaps as an intermediate. The soap mixture is subsequently dissolved in a polar solvent and then contacted with a non-polar solvent to precipitate the diacids.

The crude crystalline acids are prepared as follows: 25 grams of 2,6-dimethylnaphthalene, 250 mls. of propionic acid and 12.5 grams of cobalt acetate hydrate were placed in a three-necked flask, equipped with a motor-driven stirrer and a reflux condenser for return of vaporized solvent. The solution was contacted with 300 cc. of oxygen per minute while stirring at 1300 r.p.m. Temperature was maintained at 125° C. After six hours, the reaction was stopped and a precipitate of solid green acids (containing cobaltic ion) isolated on a filter. These green acids were added to 250 mls. of fresh solvent containing 12.5 grams of additional catalyst and oxidation was continued using the same flow rate, temperature and stirring. After 28 hours the product contained 98 weight percent acids, of which 77 percent were diacids determined by acid number.

According to the invention, a mixture of acids prepared by oxidation of 2,6-dimethylnaphthalene by essentially the same procedure as described above, which mixture contained 70 percent 2,6-naphthalene dicarboxylic acid, was converted to the corresponding sodium salts by contacting 5 grams of mixed acids (acid No. 456) with 200 mls. methanol as diluent. Sodium hydroxide was added by titration to neutralization using an indicator. The methanol was then evaporated. 0.3 gram of the salt mixture was then dissolved in 75 mls. of methanol and precipitated with 69 mls. of benzene. The precipitate (0.18 gram) after acidification contained 93 percent by weight diacid. The filtrate contained 0.13 gram acids after acidification of which 15 percent were diacid. This separation was conducted at room temperature and ambient pressure.

Generally similar results are obtained with ketones, esters and glycols; examples of these having been mentioned previously in this disclosure.

The invention claimed is:

1. A process for the separation of a mixture of naphthalene mono and dicarboxylic acids consisting essentially of the steps of contacting the acid mixture with a neutral salt forming amount of an alkali metal hydroxide, dissolving the resulting corresponding metal salts in a polar solvent selected from the group consisting of methanol, ethanol, normal propyl alcohol and isopropyl alcohol, adding an anti-solvent selected from the group consisting of petroleum naphtha, kerosine, crude n-heptane and aromatic hydrocarbons to the solution to selectively precipitate the dicarboxylic acid salts, said separation being carried out at a temperature in the range of 50 to 150° F. and atmospheric pressure.

2. Process according to claim 1 wherein the alkali metal hydroxide is sodium hydroxide.

3. The process according to claim 1 in which the naphthalene dicarboxylic acid is the 2,6-isomer and the alcohol is methanol.

References Cited by the Examiner
UNITED STATES PATENTS
2,556,213   6/1951   Pierotti et al. _____ 260—525

LORRAINE A. WEINBERGER, *Primary Examiner.*